(12) United States Patent
Liao

(10) Patent No.: US 6,826,841 B2
(45) Date of Patent: Dec. 7, 2004

(54) ROTATABLE LIGHT LEVELING DEVICE

(76) Inventor: Wen Shin Liao, P.O. Box 63-99, Taichung (TW), 406

( * ) Notice: Subject to any disclaimer, the term of this patent is extended or adjusted under 35 U.S.C. 154(b) by 0 days.

(21) Appl. No.: 10/436,821

(22) Filed: May 10, 2003

(65) Prior Publication Data

US 2004/0221462 A1 Nov. 11, 2004

(51) Int. Cl.$^7$ ............................................. G01C 15/00
(52) U.S. Cl. ................... 33/286; 33/227; 33/DIG. 21; 362/29; 362/259; 362/285
(58) Field of Search .................... 33/227, 281, 283, 33/285, 286, 290, 451, DIG. 21; 362/23, 29, 188, 259, 285, 287, 289

(56) References Cited

U.S. PATENT DOCUMENTS

| 5,075,824 A | * 12/1991 | Tan .............................. 362/23 |
| 5,446,635 A | * 8/1995 | Jehn ............................ 362/259 |
| 5,531,031 A | * 7/1996 | Green .................. 33/DIG. 21 |
| 5,539,990 A | 7/1996 | Le ............................... 33/283 |
| 5,836,081 A | * 11/1998 | Orosz, Jr. .................... 362/259 |
| 5,983,510 A | * 11/1999 | Wu et al. .............. 33/DIG. 21 |
| 6,019,480 A | * 2/2000 | Polkow ........................ 362/23 |
| 6,092,902 A | * 7/2000 | Weber et al. ................. 362/29 |
| 6,163,969 A | * 12/2000 | Jan et al. ....................... 33/286 |
| 6,196,702 B1 | * 3/2001 | Krietzman ................... 362/259 |
| 6,334,688 B1 | * 1/2002 | Niwa ........................... 362/23 |
| 6,467,131 B1 | * 10/2002 | Howie, Jr. .................... 362/23 |
| 6,532,676 B2 | * 3/2003 | Cunningham ................ 33/286 |
| 6,577,388 B2 | * 6/2003 | Kallabis ....................... 33/290 |
| 6,606,906 B2 | * 8/2003 | Arias ........................... 73/308 |
| 6,643,940 B1 | * 11/2003 | Donath et al. ............... 33/290 |
| 6,685,327 B2 | * 2/2004 | Dorrie .......................... 362/23 |
| 2002/0073561 A1 | * 6/2002 | Liao ............................. 33/286 |
| 2003/0014872 A1 | * 1/2003 | Chen ............................ 33/286 |
| 2003/0101606 A1 | * 6/2003 | Li ................................ 33/286 |

* cited by examiner

Primary Examiner—G. Bradley Bennett
(74) Attorney, Agent, or Firm—Alan D. Kamrath; Nikolai & Mersereau, P.A.

(57) ABSTRACT

A light leveling device includes a housing having a chamber to rotatably receive a light instrument which may generate a light beam or a reference line out through the housing. One or more batteries may be used to energize the light instrument. The light instrument may be rotated relative to the housing, for allowing the light beam or the reference line to be rotated relative to the wall members. The light instrument includes a knurled surface to be rotated by users. The light instrument includes a projection slidably engaged in a curved passage of the housing, to limit the rotational movement of the light instrument relative to the housing.

14 Claims, 5 Drawing Sheets

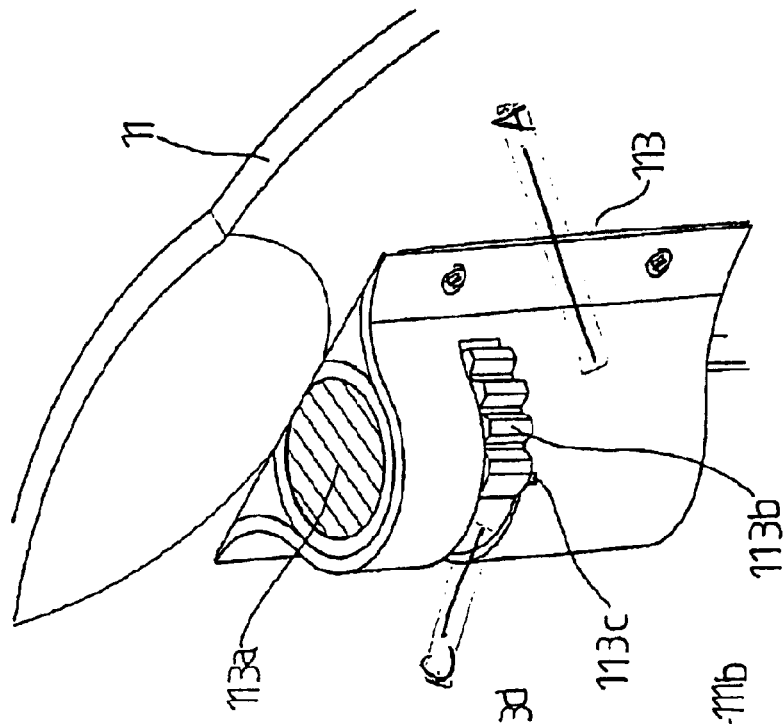
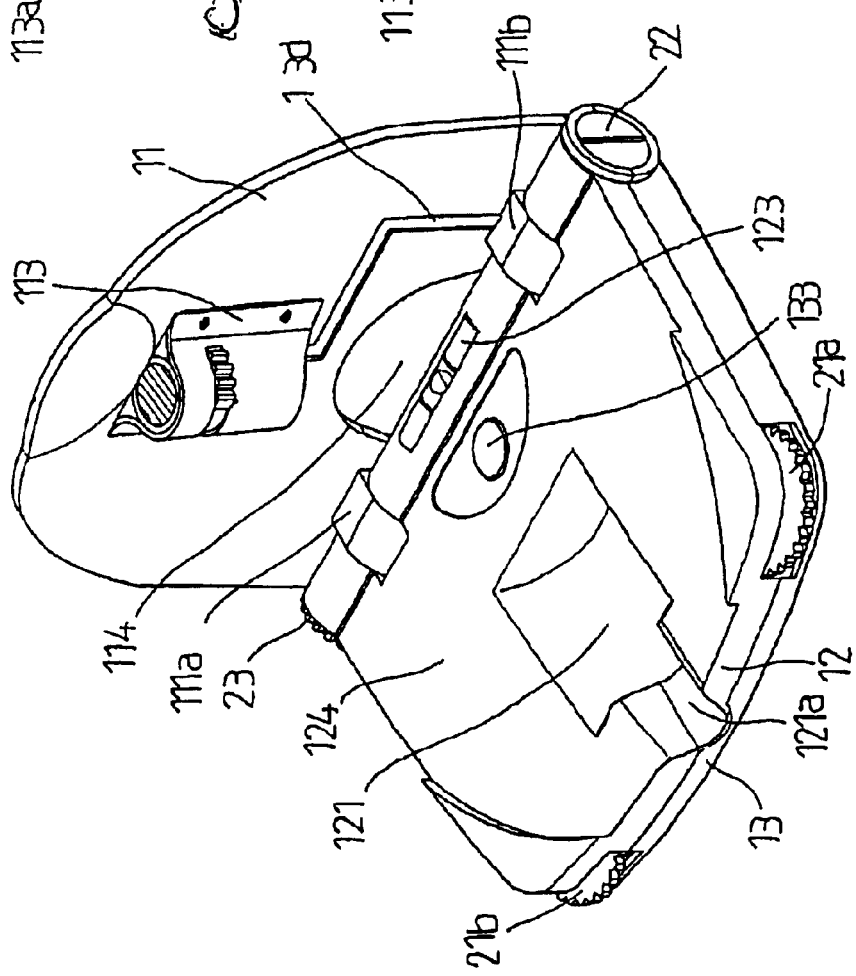
FIG. 5
FIG. 4

ROTATABLE LIGHT LEVELING DEVICE

BACKGROUND OF THE INVENTION

1. Field of the Invention

The present invention relates to a laser or light leveling device, and more particularly to a light leveling device including a rotatable laser or light instrument.

2. Description of the Prior Art

Various kinds of typical laser or light leveling devices have been developed and comprise one or more laser or light instruments attached thereto for generating one or more light beams or straight lines or reference lines of optical images toward or against wall members, for leveling or plumbing purposes.

U.S. Pat. No. 5,539,990 to Le discloses one of the typical laser or light leveling devices which comprises one or more laser or light instruments and one or more cylindrical surfaced lens attached thereto for generation of one or more light beams or straight lines or reference lines of optical images toward or against wall members.

However, the laser or light instruments and/or the cylindrical surfaced lens are solidly secured on a frame, and thus may generate one or more light beams or straight lines or reference lines of optical images toward or against wall members at the predetermined directions or angular positions relative to the frame; i.e., the laser or light instruments and/or the cylindrical surfaced lens may not be rotated or adjusted relative to the frame, and thus may not be rotated or adjusted relative to the frame to the other directions or angular positions relative to the frame.

The present invention has arisen to mitigate and/or obviate the: afore-described disadvantages of the conventional light leveling devices.

SUMMARY OF THE INVENTION

The primary objective of the present invention is to provide a light leveling device including a rotatable laser or light instrument rotatable or adjustable relative to a support housing, for facilitating the leveling or plumbing purposes thereof.

In accordance with one aspect of the invention, there is provided a light leveling device comprising a housing including a chamber formed therein, a light instrument rotatably received in the chamber of the housing and for generating a light beam out through the housing, and means for energizing the light instrument. The light instrument may be rotated relative to the housing, for allowing the light beam to be rotated to the wall members to which the light beam is aimed thereon.

The light instrument includes a knurled surface partially exposed through the housing and to be rotated by users. The knurled surface is preferably inclined relative to the light instrument. The housing includes an opening formed therein and communicating with the chamber of the housing to expose the knurled surface of the light instrument.

A device is preferably provided for limiting a rotational movement of the light instrument relative to the housing. The limiting means includes a curved passage formed in the housing, and includes a projection extended from the light instrument and slidably engaged in the curved passage of the housing, to limit the rotational movement of the light instrument relative to the housing.

The housing includes at least one space formed therein, and at least one vial received in the space thereon. The housing includes an opening formed in a bottom thereof, and a metal frame received in the opening of the housing. The frame includes a bar provided thereon to form at least one channel therein, and the housing includes at least one flap extended into the channel of the frame, to position the frame in the housing.

The frame includes at least one groove formed therein, at least one metal plate is disposed on the frame and includes a bottom flange engaged into the groove of the frame, and a magnet is disposed on the frame and attracted to the metal plate.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
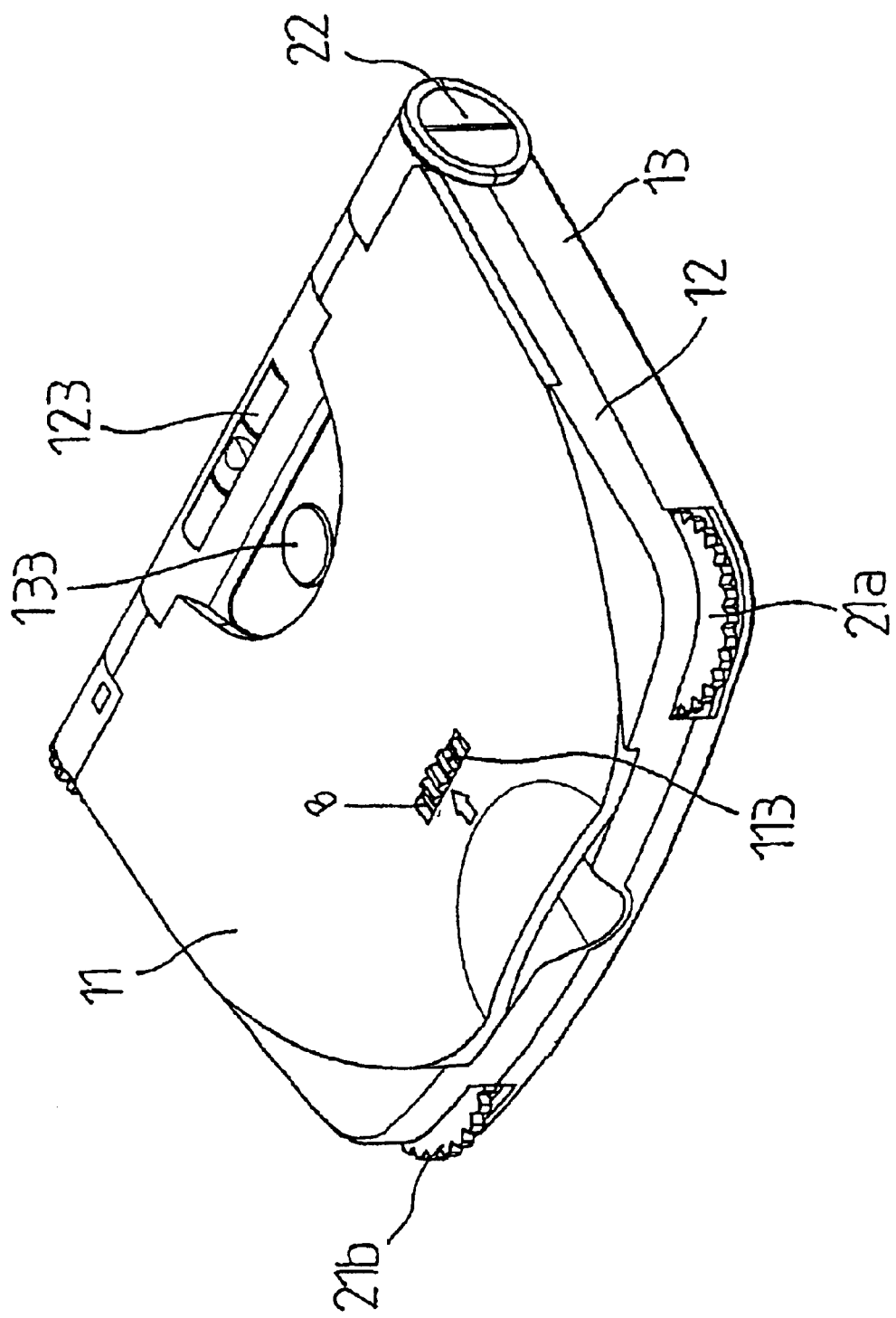
FIG. 1 is an exploded view of a light leveling device in accordance with the present invention.

Referring to the drawings, and initially to FIGS. 1–4, a light leveling device in accordance with the present invention comprises a supporting housing 10 such as including two half members 11 detachable secured together with fasteners 12, and including an opening 14 formed in the bottom thereof for receiving an I-shaped metal frame 20.

The I-shaped metal frame 20 includes a bar 21 provided on the upper portion thereof to form or define two channels 22 therein, and the frame 20 includes one or more grooves 23 formed therein. The housing 10 includes one or more, such as two, flaps 15 extended into the opening 14 thereof, and engaged into the channels 22 of the frame 20 respectively, to position or retain the frame 20 in the housing 10.

One or more, such as two, metal plates 24 are disposed on the frame 20, and each of the plates 24 includes a bottom flange 25 engaged into the grooves 23 of the frame 20, and secured to the frame 20 such as with force-fitted engagements, adhesive materials, or by welding processes. One or more magnets 27 are disposed on the frame 20 and engaged or contacted with or attracted to the plates 24, to magnetically attract the frame 20 and the plated 24 onto various metal or magnetically attractable members.

The housing 10 includes one or more spaces 16 formed therein to receive vials 30 therein, and includes a chamber 17 and an aperture 18 formed in the front portion thereof and communicating with each other.

Figure 2:
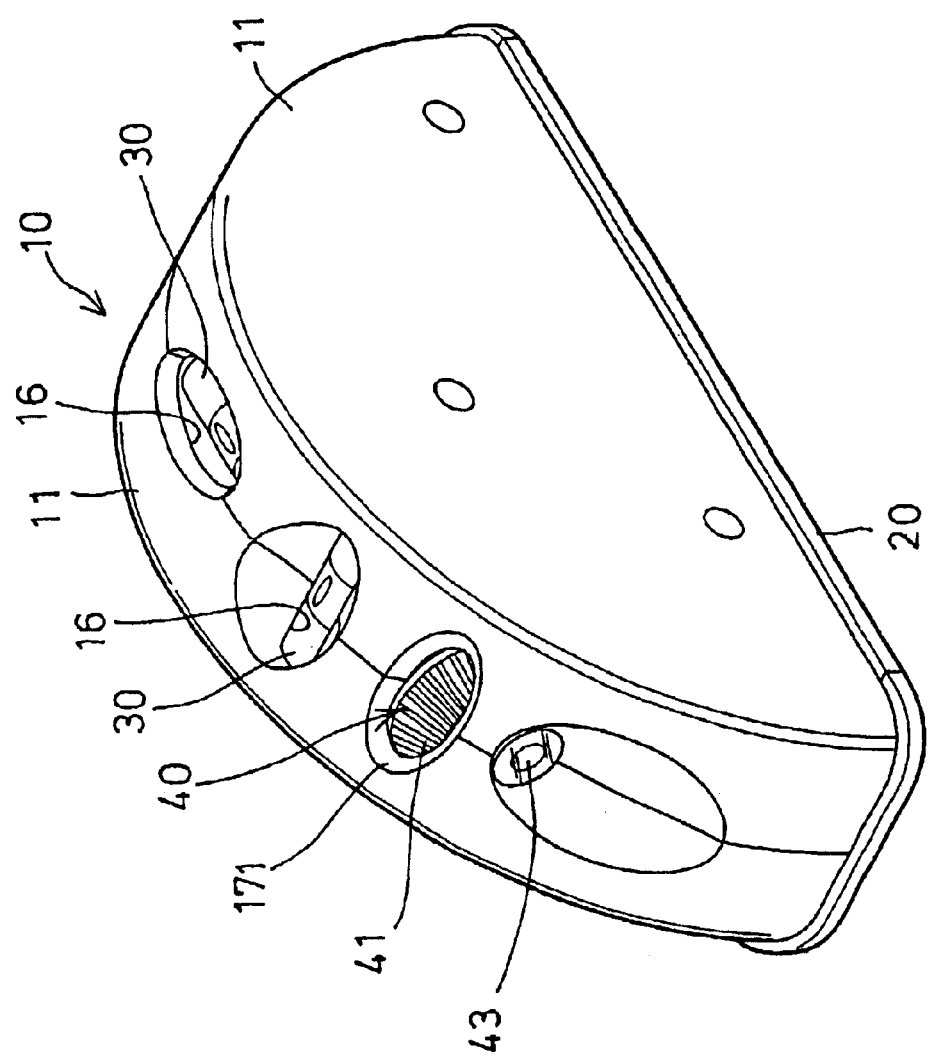
FIG. 2 is a perspective view of the light leveling device.
Figure 3:
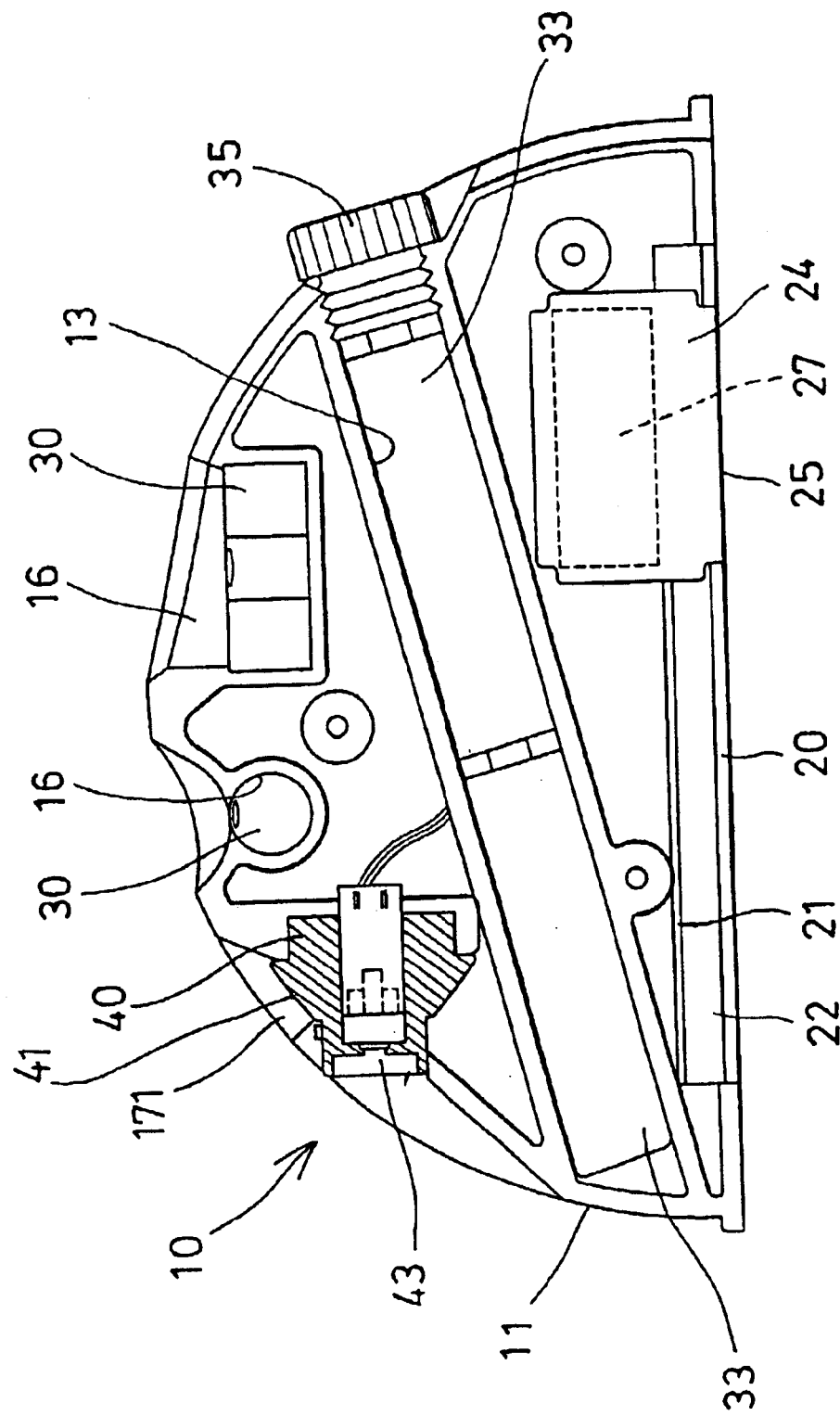
FIG. 3 is a side plan view of the light leveling device, in which one half of the supporting housing has been removed for showing the inner structure of the light leveling device.
Figure 5:
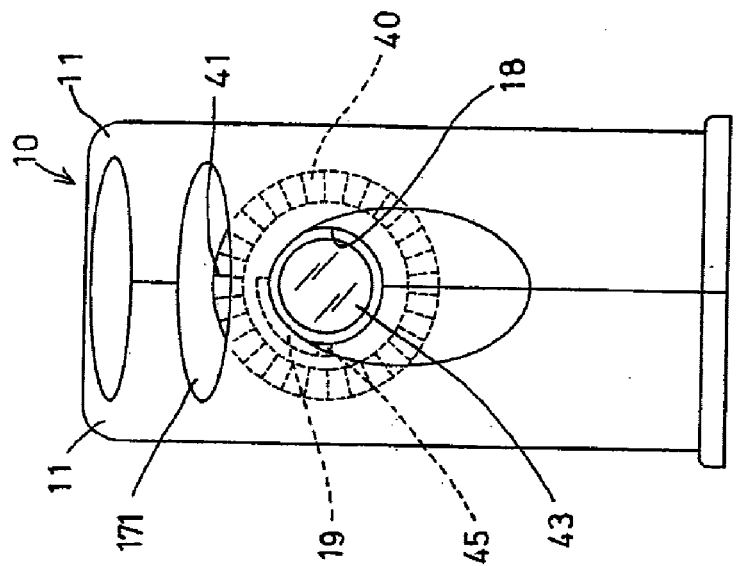
FIG. 5 is a front plan view similar to FIG. 4, illustrating the operation of the light leveling device.
Figure 4:
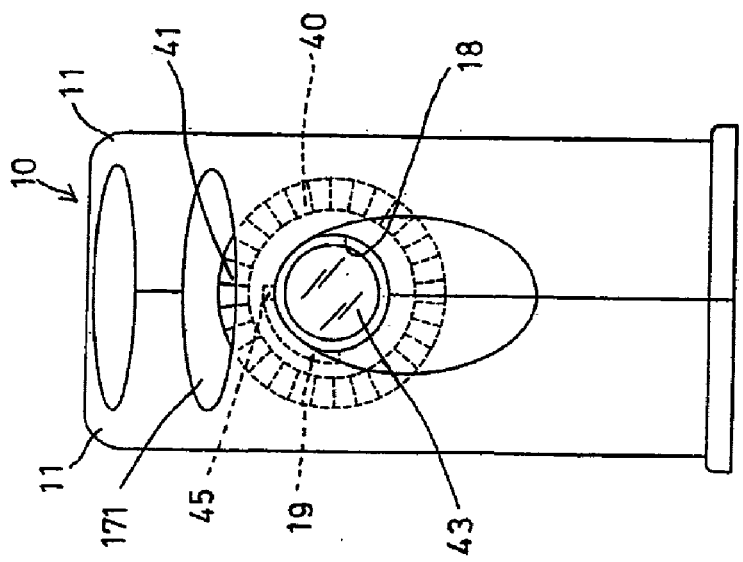
FIG. 4 is a front plan view of the light leveling device.
Figure 6:
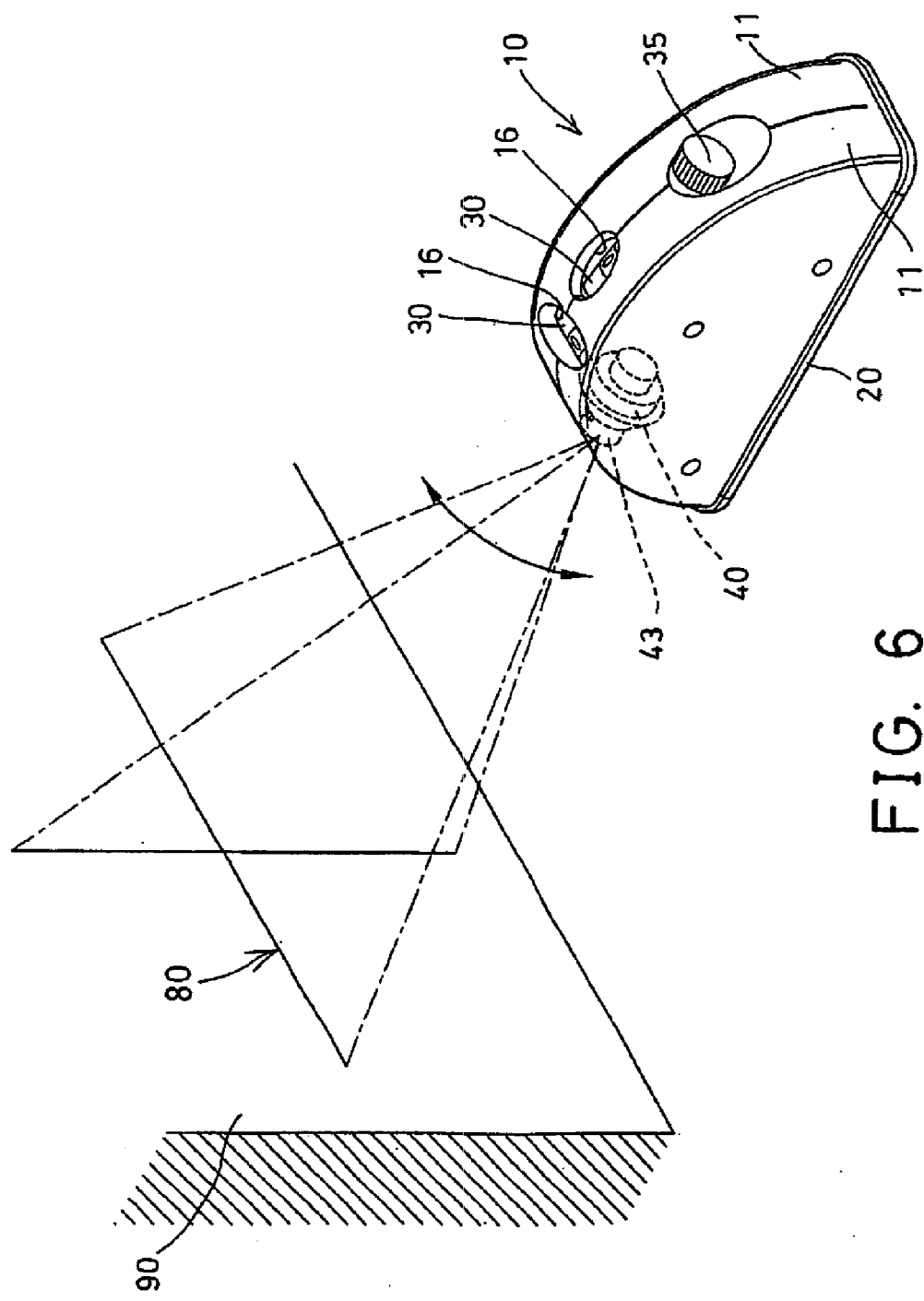

A laser or light instrument 40 is rotatably received in the chamber 17 of the housing 10, and rotatable relative to the housing 10, and includes an inclined and knurled surface 41 formed thereon and partially exposed through an opening 171 of the housing 10, best shown in FIGS. 2 and 4-5, for allowing the light instrument 40 to be rotated by the users with the inclined and knurled surface 41 thereof The light instrument 40 includes a lens, a front portion of a head 43 rotatably received in the aperture 18 of the housing 10, and the light instrument 40 may generate a light beam or straight line or reference lines 80 of optical image through the aperture 18 of the housing 10, and toward or against wall members 90, for leveling or plumbing purposes.

The housing 10 includes a curved passage 19 (FIGS. 1, 4, 5) formed therein, and the light instrument 40 includes a projection 45 extended therefrom and slidably engaged in the curved passage 19 of the housing 10, in order to limit the rotational movement of the light instrument 40 relative to the housing 10.

Figure 6:
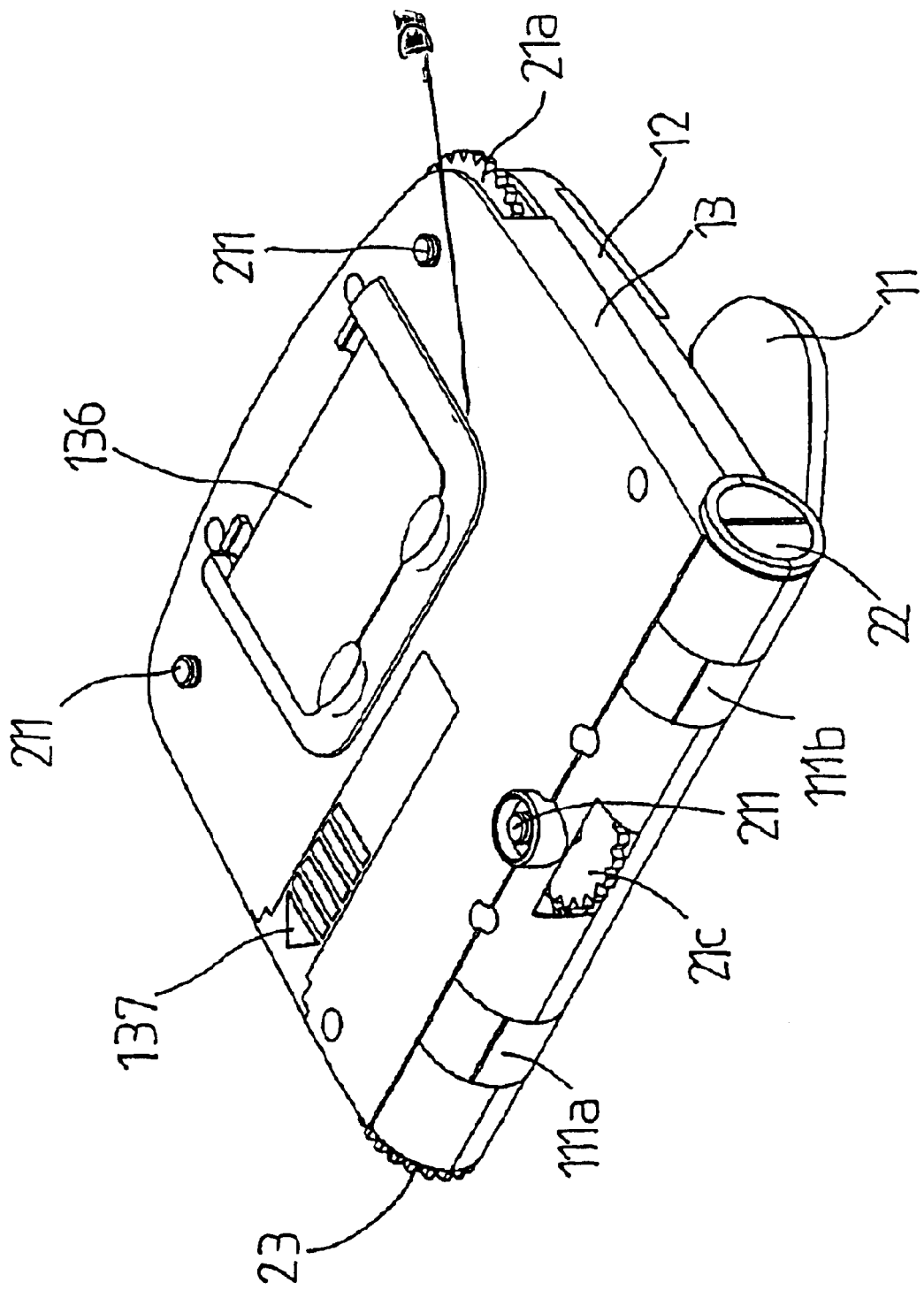
FIG. 6 is a perspective view illustrating the operation of the light leveling device.
Figure 1:
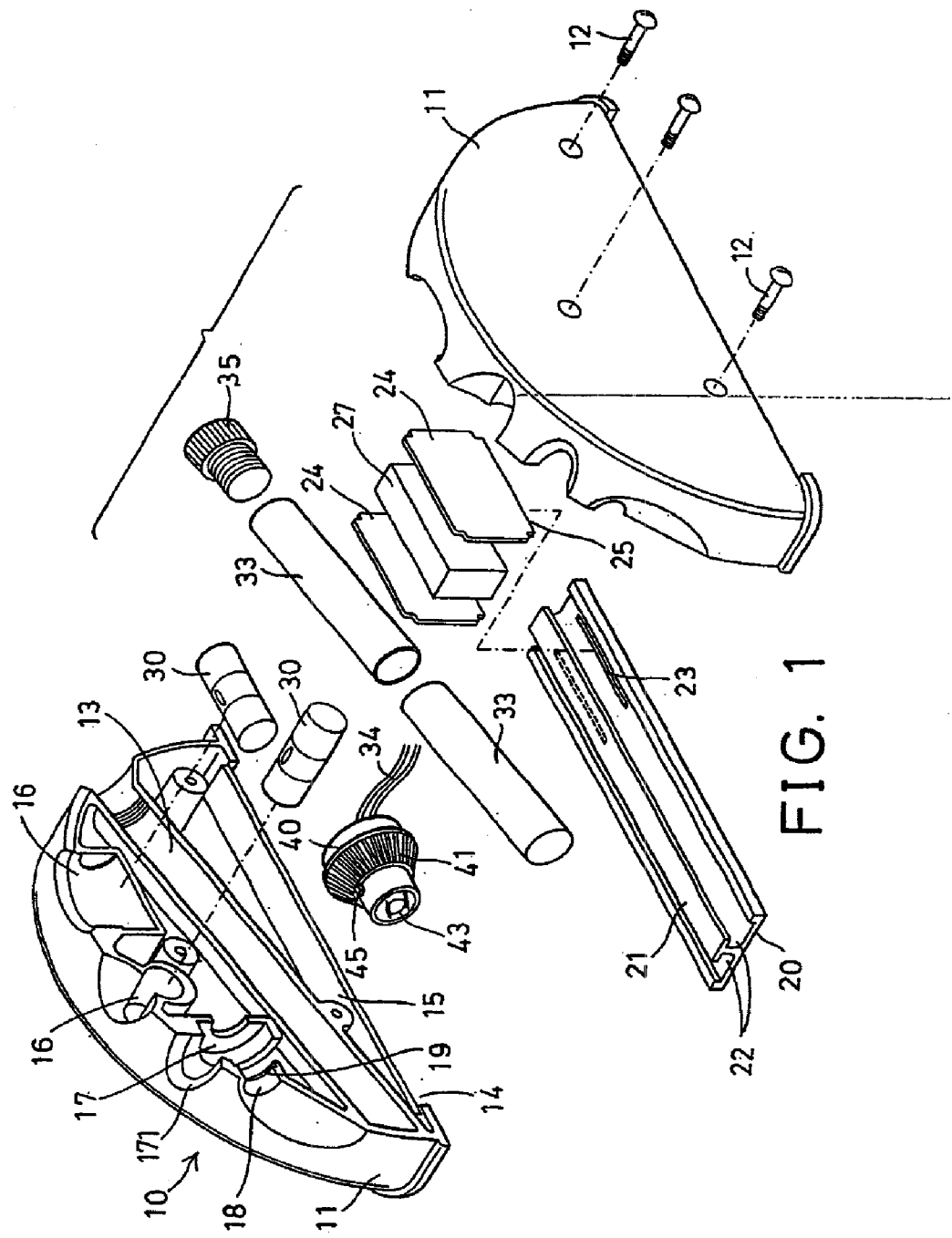

For example, the curved passage 19 of the housing 10 includes a portion, such as a quarter (¼) of a circle, for allowing the light instrument 40 to be rotated relative to the housing 10 for ninety (90) degrees (FIGS. 4, 5), and thus for allowing the straight line or reference line 80 of the optical image to be rotated between a horizontal position and a vertical or erect position, best shown in FIG. 6.

The housing 10 includes another space 13 formed therein to receive one or more batteries 33 therein. The batteries 33 are electrically coupled to the light instrument. 40 with such as electric wires 34, in order to energize the light instrument 40. A cap 35 may be threaded to the housing 10, in order to retain the batteries 33 within the housing 10.

In operation, as shown in FIG. 6, the housing 10 may be attached onto various supporting surfaces by the magnets 27 and/or the metal plates 24 and/or the metal frame 20. The users may rotate the light instrument 40 with the inclined and knurled surface 41 of the light instrument 40, in order to rotate or adjust the light beam or straight line or reference line 80 of the optical image relative to the wall members 90.

The prior or conventional laser or light leveling devices do not have laser or light instruments or cylindrical surfaced lens that may be rotated or adjusted relative to the supporting housing to other directions or angular positions.

Accordingly, the light leveling device in accordance with the present invention includes a rotatable laser or light instrument rotatable or adjustable relative to the support housing, for facilitating the leveling or plumbing purposes thereof.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

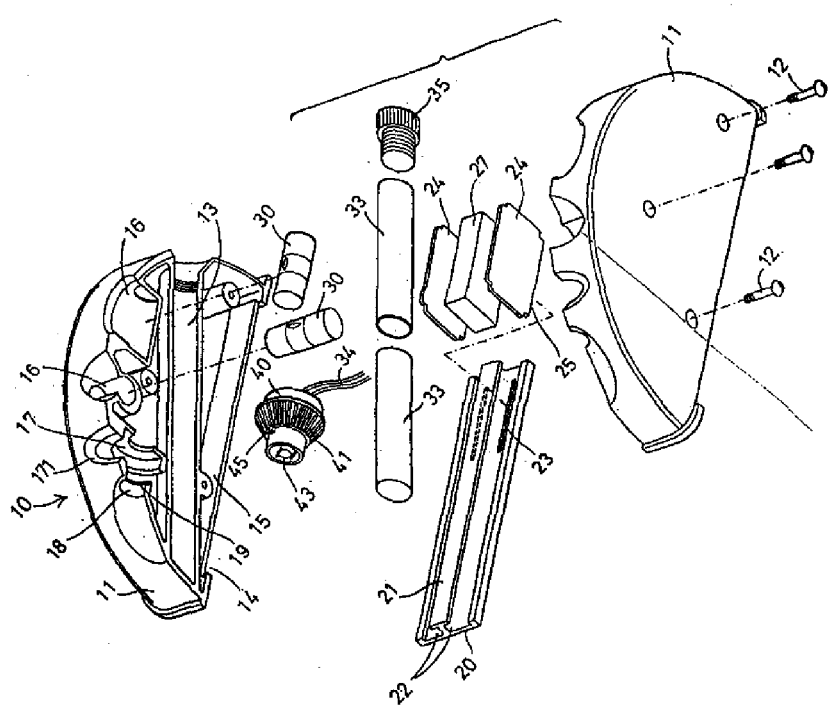

I claim:

1. A light leveling device comprising:
    a housing including a chamber formed therein;
    a light instrument rotatably received said chamber of said housing about a rotation axis, with the light instrument includes beam out through said housing; and
    means for energizing said light instrument, wherein said light instrument includes a knurled surface partially exposed through said housing and to be rotated by users, wherein said knurled surface is inclined relative to the rotation axis of said light instrument.

2. The light leveling device as claimed is claim 1, wherein said housing includes an opening formed therein said communicating with said chamber of said housing to expose said knurled surface of said light instrument.

3. The light leveling device as claimed in claim 1 further comprising means for limiting rotational movement of said light instrument relative to said housing.

4. The light leveling device as claimed is claim 3, wherein said limiting means includes a curved passage formed in said housing, and includes a projection extended from said light instrument and slidably engaged in said curved passage of said housing, to limit the rotational movement of said light instrument relative to said housing.

5. The light leveling device as claimed in claim 1, wherein said housing includes first and second spaces formed therein, and first and second vials received in said first and second spaces, with the first vial orientated at 90° to the second vial.

6. The light leveling device as claimed in claim 1, wherein said housing defines an interior, wherein the housing includes an opening formed in a bottom thereof providing access to the interior, wherein the housing includes an opening formed in a bottom thereof providing access to the interior, and a metal frame received in said opening of said housing and extending into the interior.

7. The light leveling device as claim in claim 6, wherein said metal frame includes a bar provided thereon to form at least one channel therein, and said housing includes at least one flap extended into said at least one channel of said metal frame, to position the bar of said metal from in the interior of said housing.

8. The light leveling device as claimed in claim 6, wherein said metal frame includes at least one groove formed therein, at least one metal plate is disposed in the interior of the housing on said metal frame and includes a bottom flange engaged into said at least one groove of said metal frame, and a magnet is disposed in the interior of the housing on said frame and attracted to said at least one metal plate.

9. A light leveling device comprising:
    a housing including a chamber formed therein, with the housing defining an interior, with the housing further including an opening formed in a bottom thereof providing access to the interior;
    a light instrument received in the chamber of the housing, with the light instrument generating a light beam out through the housing;
    means for energizing the light instrument; and
    a metal frame having I-shaped cross-sections, with the metal frame including a bar defining first and second channels therein, with the metal frame received in the opening with the bar located inside of the interior of the housing and with the housing including first and second flaps extended into the first and second channels to position the metal frame in the housing.

10. The light leveling device as claimed in claim 9, wherein said metal frame includes at least one groove formed therein, at least one metal plate is disposed in the interior of the housing on said metal frame and includes a bottom flange engaged into said at least one groove of said metal frame, and a magnet is disposed in the interior of the housing on said frame and attracted to said at least one metal plate.

11. The light leveling device as claimed in claim 10, wherein the metal frame includes another grove formed on and opposite side of the bar than the at least one groove; wherein the magnet has a width equal to the bar; and wherein the light leveling device further comprises another metal plate including a bottom flange engaged into the other groove, with the other metal plate being disposed on the metal frame on the opposite side of the bar than the at least one metal plate.

12. The light leveling device of claim 11, wherein the interior of the housing includes a compartment inclined relative to the bottom, with the magnet located intermediate the compartment and the bottom, with the energizing means including at least a first battery located in the compartment.

13. The light leveling device of claim 12, wherein the compartment is cylindrical in shape having circular cross-sections, wherein the light leveling device further comprises a cap threadably received in the compartment in order to retain the at least first battery within the compartment.

14. The light leveling device as claimed in claim 9, wherein said housing includes first and second spaces formed therein, and first and second vials received in said first and second spaces, with the first vial orientated at 90° to the second vial.

* * * * *

UNITED STATES PATENT AND TRADEMARK OFFICE
CERTIFICATE OF CORRECTION

PATENT NO.     : 6,826,841 B2
DATED          : December 7, 2004
INVENTOR(S)   : Wen Shin Liao It is certified that error appears in the above-identified patent and that said Letters Patent is hereby corrected as shown below:

The title page showing the illustrative figure should be deleted to be replaced with the attached title page.

Drawing sheet, consisting of Figs. 1, 4 and 5, should be deleted to be replace with the drawing sheet, consisting of Figs. 1, 4 and 5, as shown on the attached page.

Signed and Sealed this

Fifth Day of July, 2005

JON W. DUDAS
*Director of the United States Patent and Trademark Office*

(12) United States Patent
Liao

(10) Patent No.: US 6,826,841 B2
(45) Date of Patent: Dec. 7, 2004

(54) ROTATABLE LIGHT LEVELING DEVICE

(76) Inventor: Wen Shin Liao, P.O. Box 63-99, Taichung (TW), 406

(*) Notice: Subject to any disclaimer, the term of this patent is extended or adjusted under 35 U.S.C. 154(b) by 0 days.

(21) Appl. No.: 10/436,821

(22) Filed: May 10, 2003

(65) Prior Publication Data

US 2004/0221462 A1 Nov. 11, 2004

(51) Int. Cl.[7] .............................. G01C 15/00
(52) U.S. Cl. .................. 33/286; 33/227; 33/DIG. 21; 362/29; 362/259; 362/285
(58) Field of Search .............. 33/227, 281, 283, 33/285, 286, 290, 451, DIG. 21; 362/23, 29, 188, 259, 285, 287, 289

(56) References Cited

U.S. PATENT DOCUMENTS

| | | | | |
|---|---|---|---|---|
| 5,075,824 A | * | 12/1991 | Tan | 362/23 |
| 5,446,635 A | * | 8/1995 | Jehn | 362/259 |
| 5,531,031 A | * | 7/1996 | Green | 33/DIG. 21 |
| 5,539,990 A | | 7/1996 | Le | 33/283 |
| 5,836,081 A | * | 11/1998 | Orosz, Jr. | 362/259 |
| 5,983,510 A | * | 11/1999 | Wu et al. | 33/DIG. 21 |
| 6,019,480 A | * | 2/2000 | Polkow | 362/23 |
| 6,092,902 A | * | 7/2000 | Weber et al. | 362/29 |
| 6,163,969 A | * | 12/2000 | Jan et al. | 33/286 |
| 6,196,702 B1 | * | 3/2001 | Krietzman | 362/259 |
| 6,334,688 B1 | * | 1/2002 | Niwa | 362/23 |
| 6,467,131 B1 | * | 10/2002 | Howie, Jr. | 362/23 |
| 6,532,676 B2 | * | 3/2003 | Cunningham | 33/286 |
| 6,577,388 B2 | * | 6/2003 | Kallabis | 33/290 |
| 6,606,906 B2 | * | 8/2003 | Arias | 73/308 |
| 6,643,940 B1 | * | 11/2003 | Donath et al. | 33/290 |
| 6,685,327 B2 | * | 2/2004 | Dorrie | 362/23 |
| 2002/0073561 A1 | * | 6/2002 | Liao | 33/286 |
| 2003/0014872 A1 | * | 1/2003 | Chen | 33/286 |
| 2003/0101606 A1 | * | 6/2003 | Li | 33/286 |

* cited by examiner

*Primary Examiner*—G. Bradley Bennett
(74) *Attorney, Agent, or Firm*—Alan D. Kamrath; Nikolai & Mersereau, P.A.

(57) ABSTRACT

A light leveling device includes a housing having a chamber to rotatably receive a light instrument which may generate a light beam or a reference line out through the housing. One or more batteries may be used to energize the light instrument. The light instrument may be rotated relative to the housing, for allowing the light beam or the reference line to be rotated relative to the wall members. The light instrument includes a knurled surface to be rotated by users. The light instrument includes a projection slidably engaged in a curved passage of the housing, to limit the rotational movement of the light instrument relative to the housing.

14 Claims, 5 Drawing Sheets